3,330,858
MANDELIC ACID ESTERS
Gustav Ehrhart, Bad Soden, Taunus, Ernst Lindner, Frankfurt am Main, and Heinrich Ott, Eppstein, Taunus, Germany, assignors to Farbwerke Hoechst Aktiengesellschaft vormals Meister Lucius & Bruning, Frankfurt am Main, Germany, a corporation of Germany
No Drawing. Filed Apr. 1, 1963, Ser. No. 269,725
Claims priority, application Germany, Apr. 14, 1962, F 36,552, F 36,554
5 Claims. (Cl. 260—473)

The present invention relates to mandelic acid esters which show a favorable physiological action particularly on the heart and the blood circulation. The compounds may be used as medicaments having a beneficial action on cardiac and blood vascular circulation. The invention also relates to a process for preparing the afore-mentioned compounds, and furthermore, provides pharmaceutical preparations containing mandelic acid esters as active ingredients and exhibiting a beneficial action on the heart and the blood circulation.

We have found a process for the manufacture of mandelic acid esters of the general Formula I

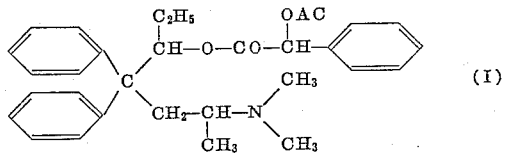

in which AC represents the formyl, acetyl or propionyl radical, and of the addition salts of said compounds with physiologically tolerable acids, wherein one of the four stereo-isomers of 4,4-diphenyl-6-dimethyl-amino-heptanol-(3) is acylated with a reactive derivative of mandelic acid, the free hydroxy group of which is converted into a formyloxy, acetyloxy or propionyloxy group either before or after the acylation. The stereoisomers are described in J. Org. Chem. 17, 321 (1952) and J. Am. Chem. Soc. 71, 460 (1959).

As reactive mandelic acid derivatives there may preferably be used halides, especially chlorides of mandelic acid, the free hydroxy group of which is esterified with formic acid, acetic acid or propionic acid. As starting substances there may be mentioned, formyl-mandelic acid chloride, acetyl-mandelic acid chloride and propionyl mandelic acid chloride. These substances may be prepared according to the method described in "Beilstein, 4th edition, vol. 10, page 203."

Generally, the acylation of α-D-4,4-diphenyl-6-dimethyl-amino-heptanol-(3), α-L-4,4-diphenyl-6-dimethyl-amino-heptanol-(3), β-D-4,4-diphenyl-6-dimethyl-amino-heptanol-(3) and β-L-4,4-diphenyl-6-dimethyl-amino-heptanol-(3) with, for example, an acyl mandelic acid chloride, takes place spontaneously and is advantageously carried out in an inert solvent, for example in benzene, toluene, ether, chloroform or acetic ester. Since the diphenyl alkanols contain a basic group, the hydrochloric acid liberated in the reaction is bound by salt-formation with the basic reaction product. Thus, there are directly obtained the hydrochlorides of the basic products of the invention from which the free bases can be obtained in the usual manner, for example, by the addition of alkali metal hydroxide solution and by subsequent extraction with ether.

The basic products of the process of the present invention may be converted into their corresponding salts by means of physiologically tolerable inorganic or organic acids. As examples of inorganic acids there may be mentioned hydrohalic acids, such as hydrochloric acid and hydrobromic acid, sulfuric acid, phosphoric acid and amidosulfonic acid. As examples of organic acids there may be mentioned, acetic acid, propionic acid, lactic acid, glycollic acid, gluconic acid, maleic acid, succinic acid, tartaric acid, benzoic acid, salicylic acid, citric acid, aceturic acid, hydroxyethane-sulfonic acid and ethylene-diamine-tetracetic acid.

The products of the present invention have an especially beneficial efficiency on the heart and blood vascular circulation and particularly cause a dilatation of the coronary vessels of the heart, which can be demonstrated by pharmacological tests. For example, upon application of 5 micrograms of the hydrochloride of the acetyl-mandelic acid ester of β-D-4,4-diphenyl-6-dimethyl-amino-heptanol-(3) by means of injection into an isolated guinea pig heart according to the method of Langendorff, a strong dilatation of the coronary vessels was observed. In comparison to the untreated guinea pig heart, this dilatation corresponded to an increase of the coronary blood flow of about 33%. Under the same test conditions, the administration of 5 micrograms of the hydrochloride of the acetyl-mandelic acid ester of α-L-4,4-diphenyl-6-dimethyl-amino-heptanol-(3) revealed an average increase of the coronary blood flow amounting to 30%. The injection of 5 micrograms of the hydrochloride of the acetyl-mandelic acid ester of α-D-4,4-diphenyl-6-dimethyl-amino-heptanol-(3) caused an average increase of the coronary blood flow amounting to 34%, and the administration of 5 micrograms of the hydrochloride of the acetyl-mandelic acid ester of β-L-4,4-diphenyl-6-dimethyl-amino-heptanol-(3) by means of injection revealed an average increase of the coronary blood flow of 32%. Furthermore, according to another method the blood perfusion of the Ramus circumflexus of the left coronary artery of a dog heart in situ was examined in dogs being in a state of narcosis. Upon the injection of 0.2 milligram of the following compounds, the increase of the blood flow in this artery branch amounted on the average to the following values:

acetyl-mandelic acid ester of β-D-4,4-diphenyl-6-dimethyl-amino-heptanol-(3)=105%
acetyl-mandelic acid ester of α-D-4,4-diphenyl-6-dimethyl-amino-heptanol-(3)=60%
acetyl-mandelic acid ester of α-D-4,4-diphenyl-6-dimethyl-amino-heptanol-(3)=112%
acetyl-mandelic acid ester of β-L-4,4-diphenyl-6-dimethyl-amino-heptanol-(3)=90%

The long lasting period of action of the afore-mentioned compounds after one injection is of particular importance. On an average it amounts to 6 to 9 minutes.

The compounds of the present invention are well tolerated when administered in doses generally used for therapeutical purposes. The following values were detected for the $LD_{50}$ in toxicity tests in mice upon intravenous injection of the compounds of the present invention. The $LD_{50}$ amounted to 30 mg./kg. of mouse for the β-D-compound,
30 mg./kg. of mouse for the α-L-compound,
20 mg./kg. of mouse for the α-D-compound and
20 mg./kg. of mouse for the β-L-compound mentioned above.

In addition to the afore-mentioned physiological effects the acetyl-mandelic acid esters of α-D-4,4-diphenyl-6-dimethyl-amino-heptanol-(3) and β-L-4,4-diphenyl-6-dimethyl-amino-heptanol-(3) possess strong analgesic properties, which was detected in an analgesia test according to the method of Wolff and Hardy.

The compounds of the invention may be administered as bases or in the form of their addition salts with physiologically tolerated acids, if desired in admixture with pharmaceutically suitable carriers, either parenterally or orally. For oral administration, the compounds may be used in the form of tablets or dragees which—in addition to the compounds of the invention—also contain the pharmaceutically usual carriers, such as lactose, starch, tragacanth or magnesium stearate.

Depending on the kind and degree of the disease 5–30 milligrams of the compound may be administered as a single dose. The following examples serve to illustrate the invention, but they are not intended to limit it thereto:

Example 1

2.3 grams of β-D-4,4-diphenyl-6-dimethyl-amino-heptanol-(3) melting at 105–106° C., dissolved in 10 cc. of benzene, are reacted with 1.6 grams of acetyl-mandelic acid chloride; the reaction temperature rising to about 40° C. After allowing the solution to stand for 1 hour, ether is added in such a quantity that the solution does not become turbid. After heating for several hours, the mixture is filtered. There is obtained 0.7 gram of the hydrochloride of the acetyl-mandelic acid ester of β-D-4,4-diphenyl-6-dimethyl-amino-heptanol-(3) melting at 180–181° C.

Example 2

According to the method described in Example 1, 4.6 grams of the hydrochloride of the acetyl-mandelic acid ester of α-L-4,4-diphenyl-6-dimethyl-amino-heptanol-(3) melting at 180–181° C. are obtained from 4 grams of α-L-4,4-diphenyl-6-dimethyl-amino-heptanol-(3), melting at 80–82° C., dissolved in 10 cc. of benzene, and 2.75 grams of acetyl-mandelic acid chloride. Mixed melting point with the compound according to Example 1: 165–170° C.

Example 3

2 grams of α-D-4,4-diphenyl-6-dimethyl-amino-heptanol-(3) dissolved in 6 cc. of benzene are reacted with 1.35 grams of acetyl-mandelic acid chloride; the reaction temperature rising to about 40° C. After allowing the solution to stand for 1 hour, ether is added in such a quantity that the solution does not become turbid. After heating for several hours, the solution is filtered. There are obtained 1.8 grams of the hydrochloride of the acetyl-mandelic acid ester of α-D-4,4-diphenyl-6-dimethyl-amino-heptanol-(3) melting at 180–181° C.

Example 4

According to the method described in Example 3, 1 gram of the hydrochloride of the acetyl mandelic acid ester of β-L-4,4-diphenyl-6-dimethyl-amino-heptanol-(3) melting at 180–181° C. is obtained from 3.1 grams of β-L-4,4-diphenyl-6-dimethyl-amino-heptanol-(3) melting at 104–105° C., dissolved in 10 cc. of benzene, and 2.1 grams of acetyl-mandelic acid chloride.

We claim:
1. Mandelic acid esters of the general formula

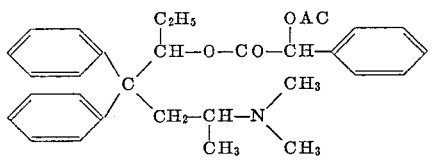

in which AC is selected from formyl, acetyl and propionyl, and addition salts of said compounds with physiologically tolerable acids.

2. Acetyl-mandelic acid ester of β-D-4,4-diphenyl-6-dimethyl-amino-heptanol-(3).
3. Acetyl-mandelic acid ester of α-L-4,4-diphenyl-6-dimethyl-amino-heptanol-(3).
4. Acetyl-mandelic acid ester of α-D-4,4-diphenyl-6-dimethyl-amino-heptanol-(3).
5. Acetyl-mandelic acid ester of β-L-4,4-diphenyl-6-dimethyl-amino-heptanol-(3).

No references cited.

LORRAINE A. WEINBERGER, *Primary Examiner.*

THOMAS L. GALLOWAY, JR., *Assistant Examiner.*